United States Patent
Compton et al.

(10) Patent No.: US 7,304,676 B2
(45) Date of Patent: Dec. 4, 2007

(54) TIMING GENERATOR FOR ELECTRONIC IMAGE SENSOR WITH TABLES THAT CONTROL LINE AND FRAME TIMING

(75) Inventors: John T. Compton, Leroy, NY (US);
David M. Charneski, Hilton, NY (US);
Wayne W. Hintz, Bergen, NY (US);
Edward P. Lawler, Fairport, NY (US);
William F. DesJardin, Holley, NY (US); Richard B. Brolly, Fairport, NY (US); Herbert J. Erhardt, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 763 days.

(21) Appl. No.: 10/635,332

(22) Filed: Aug. 6, 2003

(65) Prior Publication Data

US 2004/0095497 A1 May 20, 2004

Related U.S. Application Data

(60) Provisional application No. 60/412,206, filed on Sep. 20, 2002, provisional application No. 60/412,235, filed on Sep. 20, 2002, provisional application No. 60/412,207, filed on Sep. 20, 2002.

(51) Int. Cl.
*H04N 5/335* (2006.01)
(52) U.S. Cl. .................................................... 348/312
(58) Field of Classification Search ................ 348/312, 348/295
See application file for complete search history.

(56) References Cited

U.S. PATENT DOCUMENTS

| | | | |
|---|---|---|---|
| 5,442,465 A | | 8/1995 | Compton |
| 5,659,359 A | * | 8/1997 | Mochizuki et al. ......... 348/296 |
| 6,124,889 A | * | 9/2000 | Landowski ................. 348/312 |
| 6,784,929 B1 | * | 8/2004 | Chen ....................... 348/230.1 |
| 7,061,540 B2 | * | 6/2006 | Weaver et al. ............. 348/500 |
| 2003/0112372 A1 | * | 6/2003 | Weaver et al. ............. 348/555 |

* cited by examiner

*Primary Examiner*—Ngoc-Yen Vu
*Assistant Examiner*—Nicholas G Giles
(74) *Attorney, Agent, or Firm*—Peyton C. Watkins

(57) ABSTRACT

A timing generator for an electronic image sensor includes one or more memory based tables for controlling timing events that occur within one or more different types of image sensor lines, and one or more memory based tables for controlling timing events that occur within one or more different types of image sensor frames.

18 Claims, 10 Drawing Sheets

TIMING GENERATOR FOR ELECTRONIC IMAGE SENSOR WITH TABLES THAT CONTROL LINE AND FRAME TIMING

CROSS REFERENCE TO RELATED APPLICATIONS

Reference is made to and priority claimed from U.S. Provisional Application Ser. No. 60/412,206, filed Sep. 20, 2002, entitled TIMING GENERATOR FOR ELECTRONIC IMAGE SENSOR WITH TABLES THAT CONTROL LINE AND FRAME TIMING.

Reference is made to commonly-assigned copending U.S. patent application Ser. No. 60/412,235, filed Sep. 20, 2002, entitled PROGRAMMABLE CLOCK GENERATOR WITH OFFSET AND WIDTH CONTROL USING DELAY LOCK LOOP, by Edward P. Lawler et al.; and U.S. patent application Ser. No. 60/412,207, filed Sep. 20, 2002, entitled GRAY COUNTER IMPLEMENTATION WHICH PROVIDES ACCESS TO BINARY COUNT AND GRAY CODECS, by David Charneski, et al.

FIELD OF THE INVENTION

This invention relates generally to electronic imaging systems and, more particularly, to methods and apparatus for controlling electronic image sensors and associated components.

BACKGROUND OF THE INVENTION

Electronic image sensors and imaging systems require timing signals to operate. For area image sensors, sensors are composed of rows and columns of picture elements—pixels—that capture a complete image. The pixels are read out in raster fashion. For example, the rows of the image are accessed one at a time in order from top to bottom, and the individual pixels within a row are accessed one at a time from right to left. In this example, timing signals must be provided to control accessing the rows, and other timing signals must be provided to control accessing the individual pixels. In addition, other timing signals must be provided to control sampling and processing the output signal for each pixel as it emerges from the image sensor. Additional timing signals are required to control electronic exposure, and the various timing signals may be operated in various ways to provide different ways of reading out the image sensor.

A timing generator provides the timing signals required to operate an electronic imaging system. Timing generators are typically register/counter based, with the functionality of the timing generator targeted at a specific or limited class of image sensors or applications. Because the scope of sensors and applications is limited, many of the timing functions required are fixed or restricted in flexibility, so the timing generator may be implemented by employing fixed logic structures that are specific to the image sensor and application at hand. The resulting timing generator is fairly small but not very flexible, and each class of image sensor or application requires a unique timing generator design. Because of the difficulty and time required to develop a new timing generator for each specific situation, it is desirable to have a single timing generator that provides the flexibility to handle a wide range of image sensors and applications; it is also desirable to provide that flexibility without incurring a significant penalty in size or complexity of the timing generator.

The notion of using a memory-based table instead of fixed logic structures to control timing for an image sensor has been disclosed previously. For example, U.S. Pat. No. 5,442,465 describes a system for controlling reading out and sampling the image signal from a linear image sensor. In this system, each pixel of the linear image sensor has a corresponding set of locations in a memory that controls several different timing signals that are operated during the readout of the pixel: clock signals to the image sensor, sampling signals to the analog signal processing circuitry, a clock signal for the analog to digital converter, and signals to control digitally processing and storing the resulting digital value. This memory-based approach is very flexible, and memory structures in integrated circuits are typically very compact and efficient. This concept could be extended to an area image sensor by providing memory locations that describe the required timing signals for each pixel of the image sensor. Unfortunately, the resulting memory would be very large: area image sensors may be composed of up to 16 million pixels or larger, and each pixel might require many bits of memory to control all the timing functions. Therefore, directly extending this concept to an area image sensor would lead to very large memory sizes.

Consequently, a need exists for overcoming the above-described drawbacks. For example, a need exists to have a highly flexible timing generator for controlling a broad range of electronic image sensors in a variety of electronic imaging applications without incurring the penalties in control logic, memory size, or overall complexity that have been described in the foregoing paragraphs.

SUMMARY OF THE INVENTION

The present invention is directed to overcoming one or more of the problems set forth above. Briefly summarized, according to one aspect of the present invention, the invention provides a timing generator for an electronic image sensor that includes one or more memory based tables for controlling timing events that occur within one or more different types of lines, and one or more memory based tables for controlling timing events that occur within one or more different types of frames. The electronic image sensor may be part of an electronic imaging system that includes a timing generator, circuits to convert the timing control signals into drive signals for the image sensor, an analog to digital converter and associated analog signal processing elements to convert the analog image signal from the image sensor to digital form, and a digital memory configured to store image data provided by the analog to digital converter.

These and other aspects, objects, features and advantages of the present invention will be more clearly understood and appreciated from a review of the following detailed description of the preferred embodiments and appended claims, and by reference to the accompanying drawings.

Advantageous Effect of the Invention

The present invention has the advantages of providing timing control signals for a wide variety of electronic image sensors and electronic imaging applications without an unacceptable increase in complexity or size for the timing generator circuitry.

DETAILED DESCRIPTION OF THE INVENTION

Figure 1:
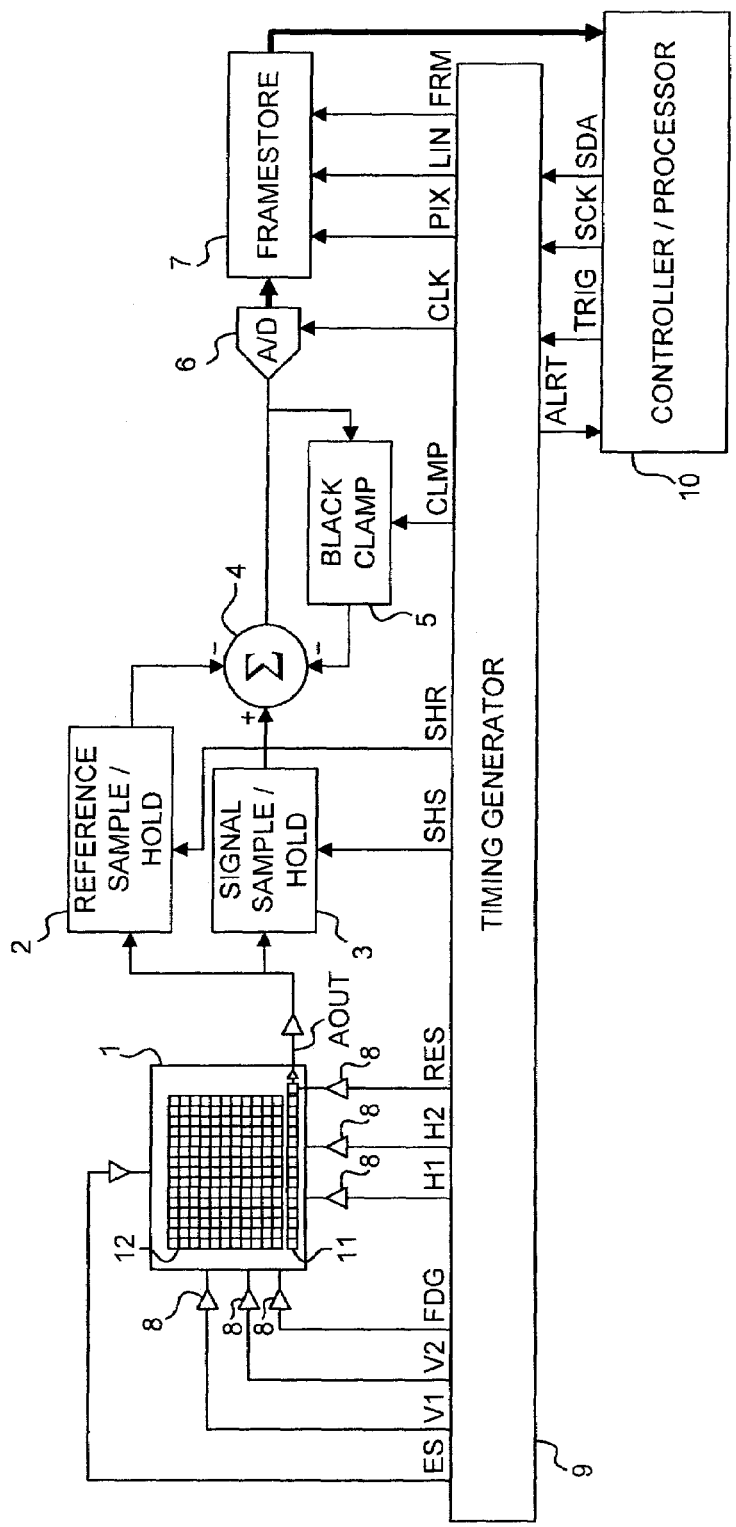
FIG. 1 is a block diagram of an electronic imaging system.

FIG. 1 illustrates an electronic imaging system of the present invention. The image sensor 1 is composed of rows and columns of light sensitive pixels 12. Timing signals ES, V1, V2, FDG, H1, H2, and RES are amplified by buffers 8 and applied to the image sensor 1. One timing arrangement of V1 and V2 causes the image signal to be transferred from the light sensitive areas 12 of the image sensor 1 to light shielded vertical shifters (not numbered and are well known in the art) adjacent the pixels 12. Another timing arrangement of V1 and V2 causes the vertical shifters to shift the transferred image signals one row down into a horizontal shifter 11. H1 and H2 cause the horizontal shifter 11 to move the image signals one at a time toward the output of the image sensor 1. RES—reset—causes the image sensor output to be reset to a reference level prior to the output of the image signal. ES—electronic shutter—is used to reset simultaneously all the pixels of the image sensor to a non-exposed state. FDG—fast dump gate—causes a row of image signals to be cleared or "dumped" instead of being shifted into the horizontal shifter 11. A typical interline charge coupled device (CCD) image sensor commonly incorporates these operational features and functions. The sample and hold circuit 2 for the reference signal is operated once per pixel by the SHR signal to capture the reset level of the image sensor output. The sample and hold circuit 3 is operated once per pixel by the SHS signal to capture the image signal for that pixel from the image sensor output. The black clamp circuit 5 is operated by the CLMP signal when certain light shielded pixels are read out from the image sensor in order to capture a black reference level—the image signal level for pixels that are not stimulated by light. The summing circuit 4 subtracts the reset reference level and the black clamp reference level from the pixel image signal. The analog to digital converter 6 converts the analog signal from the summing circuit to a digital format suitable for storage in the digital framestore memory 7. The CLK signal to the analog to digital converter indicates when to perform a conversion. The PIX, LIN, and FRM signals to the framestore memory 7 control the process of capturing data to the framestore memory: the FRM signal indicates when lines of pixels from the image sensor have valid image signals; the LIN signal indicates within a line of data which pixels have a valid image signal; and the PIX signal indicates within a pixel time when to capture the pixel data. The timing generator 9 provides all the timing signals for control of the image sensor, sample and hold circuits, black clamp circuit, analog to digital converter, and framestore. The system controller and image data processor 10 sets up the operation of the timing generator by means of the SCK and SDA signals, triggers certain events in the timing generator by means of the TRIG signal, responds to events in the timing generator by means of the ALRT signal, and processes the image data stored in the framestore. The SCK and SDA signals provide a serial data communications channel from the system controller to the timing generator, with SCK providing a clock signal and SDA providing the bits of data, one bit per clock.

Figure 2:
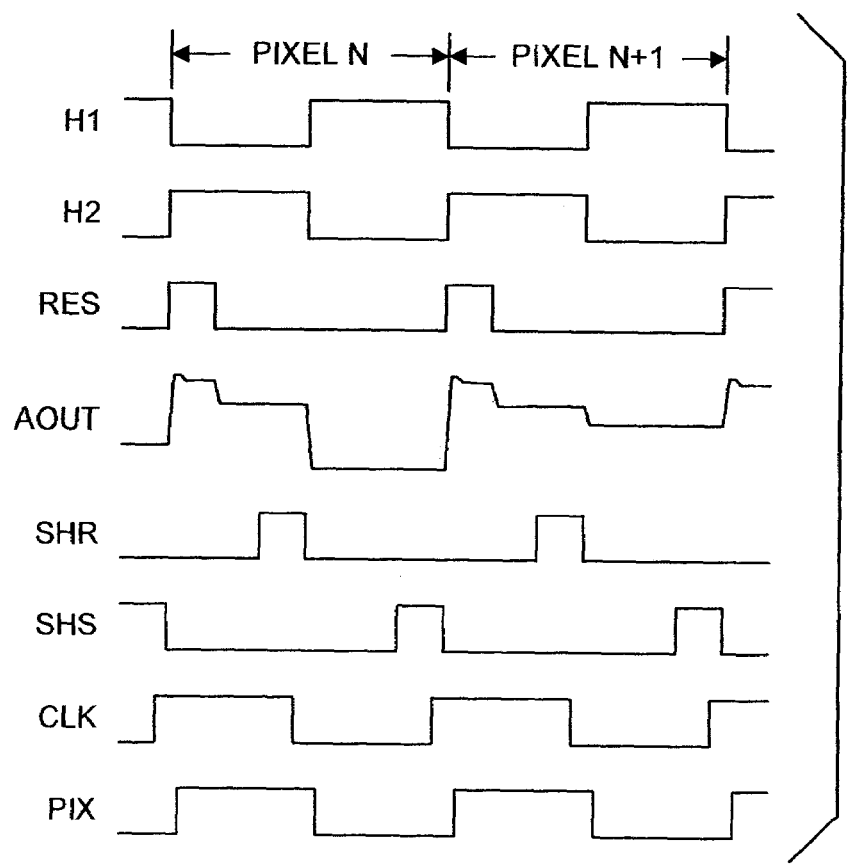
FIG. 2 is a timing diagram that shows pixel level timing control signals used by the electronic imaging system of FIG. 1.

FIG. 2 illustrates the timing signals that take place within a pixel and their relationship to the output signal from the image sensor 1. The image sensor output reset signal RES occurs at the beginning of the pixel time when H1 is low and H2 is high. A short time after deactivation of the RES signal, the image sensor output settles to its reset level and the SHR signal is operated to capture this reset level. H1 is set high and H2 is set low halfway through the pixel period in order to output the image signal for the pixel. After the image signal has settled to a stable level, the SHS signal is operated to capture the signal. The CLK signal to the analog to digital converter 6 is operated after the SHS signal is operated in order to cause the analog to digital converter to begin the process of converting the image signal for the pixel. The PIX signal to the framestore 7 is operated at the appropriate time to cause the framestore to capture the pixel data when it is output from the analog to digital converter.

Figure 3:
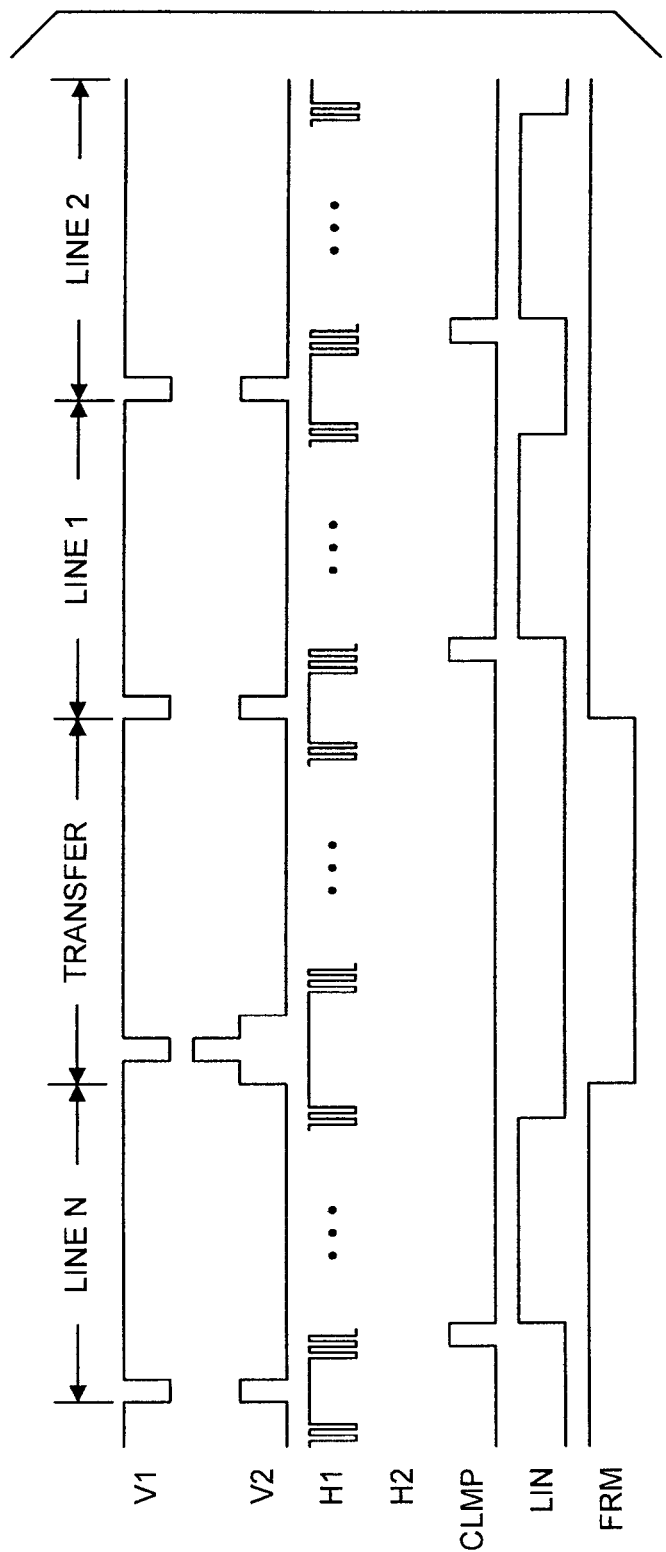
FIG. 3 is a timing diagram that shows line level timing control signals used by the electronic imaging system of FIG. 1, wherein the lines of pixels are read out normally.

FIG. 3 illustrates the line timing for normal readout of lines of pixels. The vertical signals V1 and V2 control two operations within the image sensor 1: when V1 pulses low and V2 pulses high at the same time, a line of pixel signals is transferred from the vertical shifters in the image sensor into the horizontal shifter; when V1 pulses low and V2 pulses to a still higher level, then all the pixel signals are transferred from the light sensitive regions of the image sensor into the light shielded vertical shifters. After a transfer of a line of pixel signals into the horizontal shifter 11, the horizontal clocks H1 and H2 are operated repetitively to clock the pixel image signals out of the image sensor 1. The CLMP signal is operated during the time that the pixel signals from light shielded pixels are being output in order to cause the black clamp circuit 5 to capture a black reference level for the image signal. The LIN signal is operated during the time that image signals from the normal, light exposed pixels are being output. The FRM signal is operated for all the lines that contain image signals from normal pixels. The FRM and LIN signals are provided to the framestore 7 to allow the framestore to capture the image data in a raster fashion, line by line from bottom to top of the image sensor.

Figure 4:
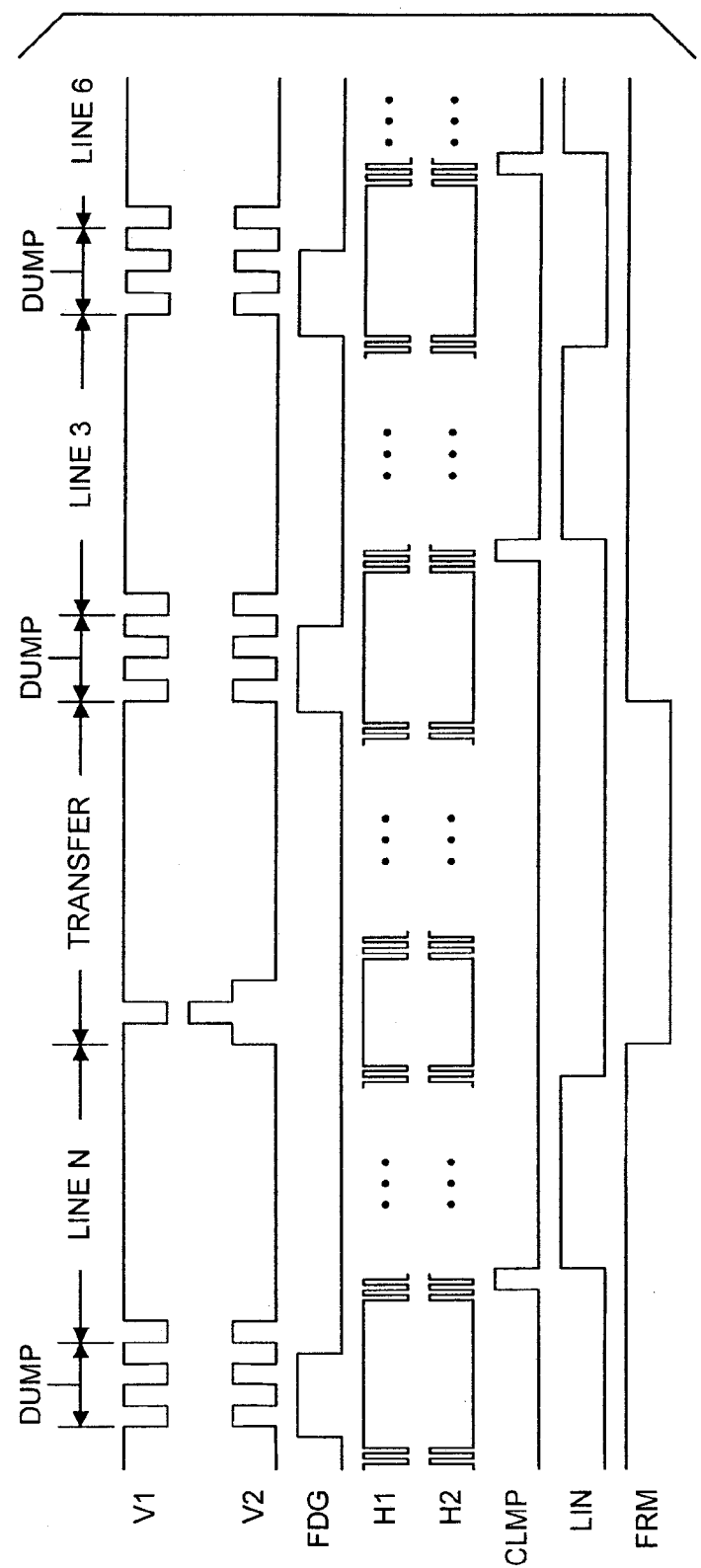
FIG. 4 is a timing diagram that shows line level timing control signals used by the electronic imaging system of FIG. 1, wherein two of three lines of pixels are electronically "dumped" and the remaining one of three lines is read out normally.

FIG. 4 illustrates an alternative image sensor readout scheme in which 2 of every 3 line of pixels are electronically "dumped" in order to reduce the effective resolution of the image sensor 1 and to speed up the readout time. FIG. 4 is similar to FIG. 3, except that V1 and V2 are operated three times in quick succession in order to shift the image signals in the vertical shifters three times downward for each line of image signals read out from the image sensor. The FDG signal is operated during the first two out of each three downward shifts in order to cause the fast dump gate of the image sensor 1 to erase the image signals for those two lines.

Figure 5A:
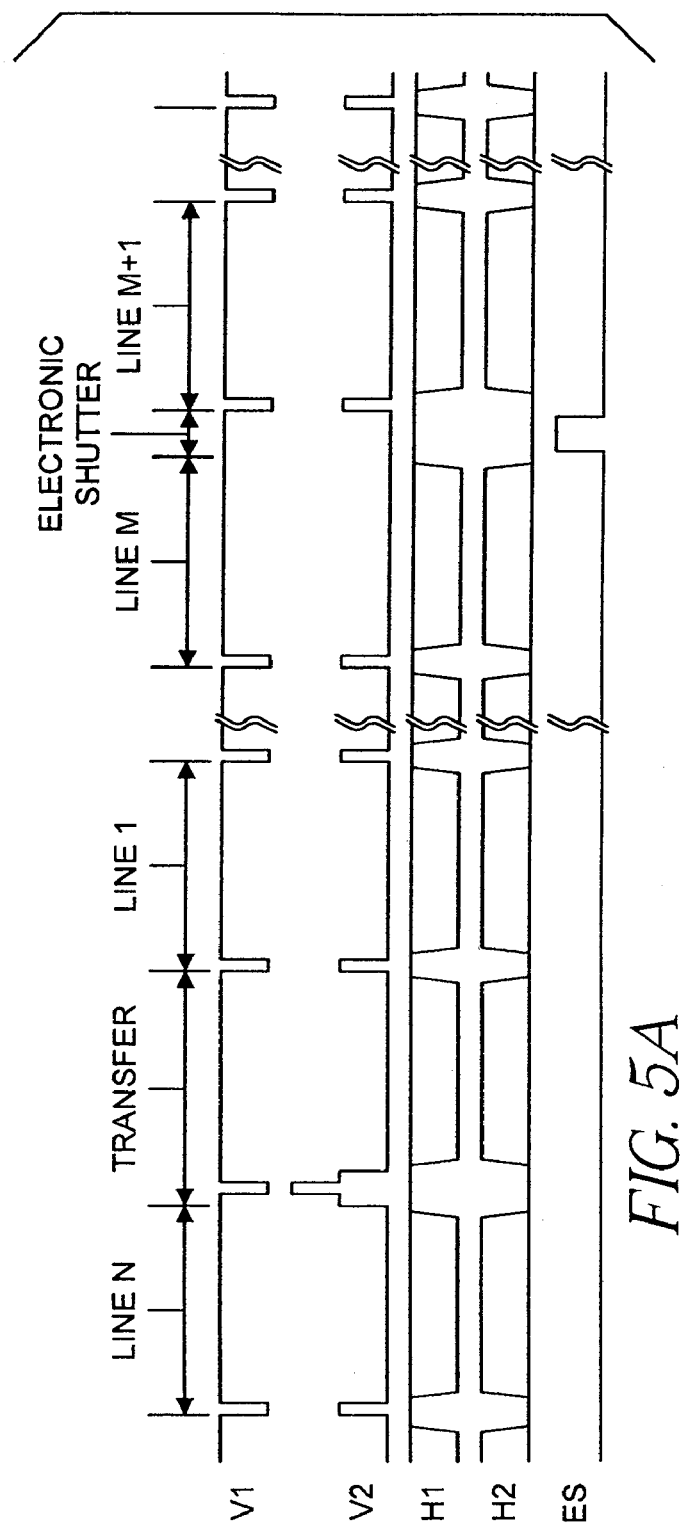
FIG. 5A is a timing diagram that shows frame level timing control signals used by the electronic imaging system of FIG. 1, showing normal readout of all pixels in the frame as well as the timing of an electronic shutter signal.
Figure 5B:
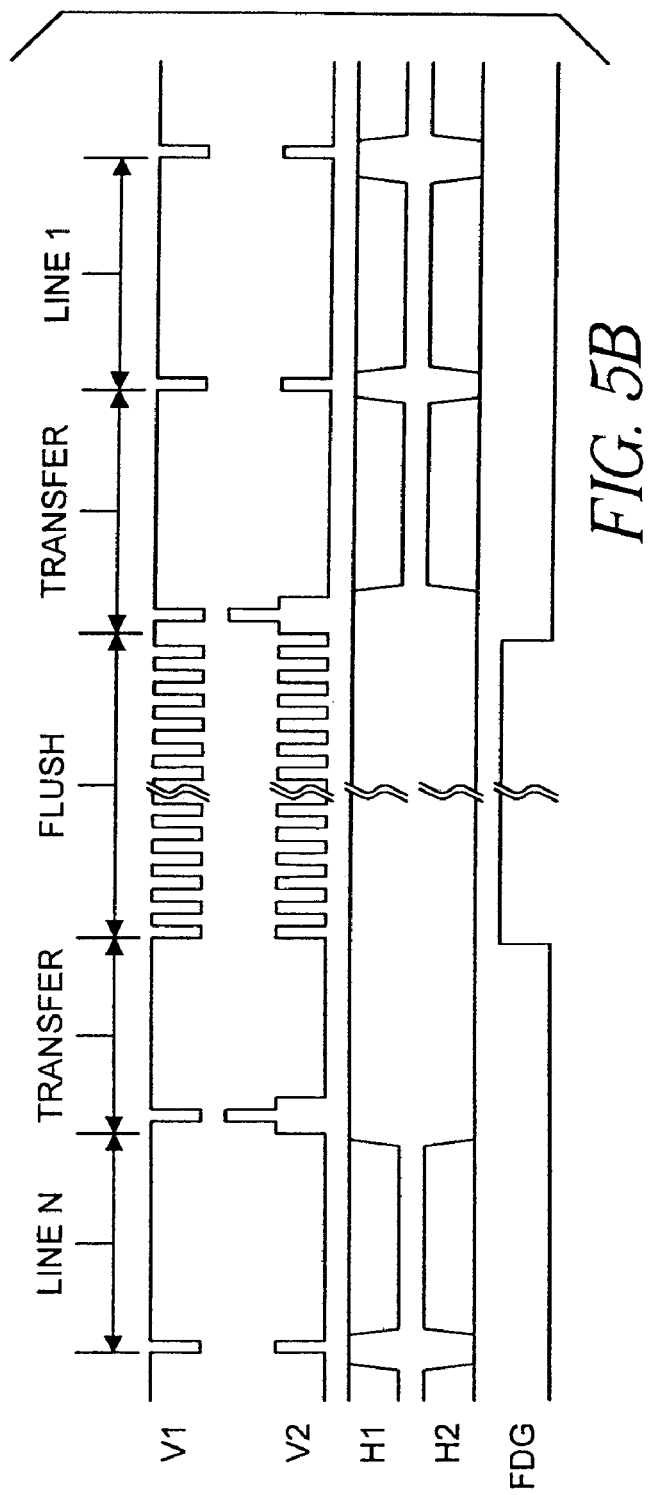
FIG. 5B is a timing diagram that shows frame level timing control signals used by the electronic imaging system of FIG. 1, showing all the pixels of the frame being electronically "dumped"

FIG. 5 illustrates the timing arrangement for signals that are operated once during the readout of the entire pixel array in the image sensor 1. In FIG. 5A, the ES signal is inserted into the line time after a line is read out but before the V1 and V2 signals are operated for the next line. The ES signal causes the image signals accumulated in the light sensitive regions of the image sensor to be erased by the electronic shutter, restarting the process of accumulating image signals. The total time to accumulate image signals, or integration time, is the time between operation of the electronic shutter and the time that V1 and V2 are operated to transfer the image signals from the light sensitive regions of the image sensor to the vertical shifters. This integration time is effectively the electronically controlled exposure time. In FIG. 5B, the V1 and V2 signals are operated repetitively in quick succession and the FDG signal is operated to cause all the lines of image signals to be erased by the fast dump gate. This effectively flushes a frame of image signals out of the image sensor. This mode of operation could be used to eliminate quickly an unwanted frame of image sensor signals.

Figure 6:
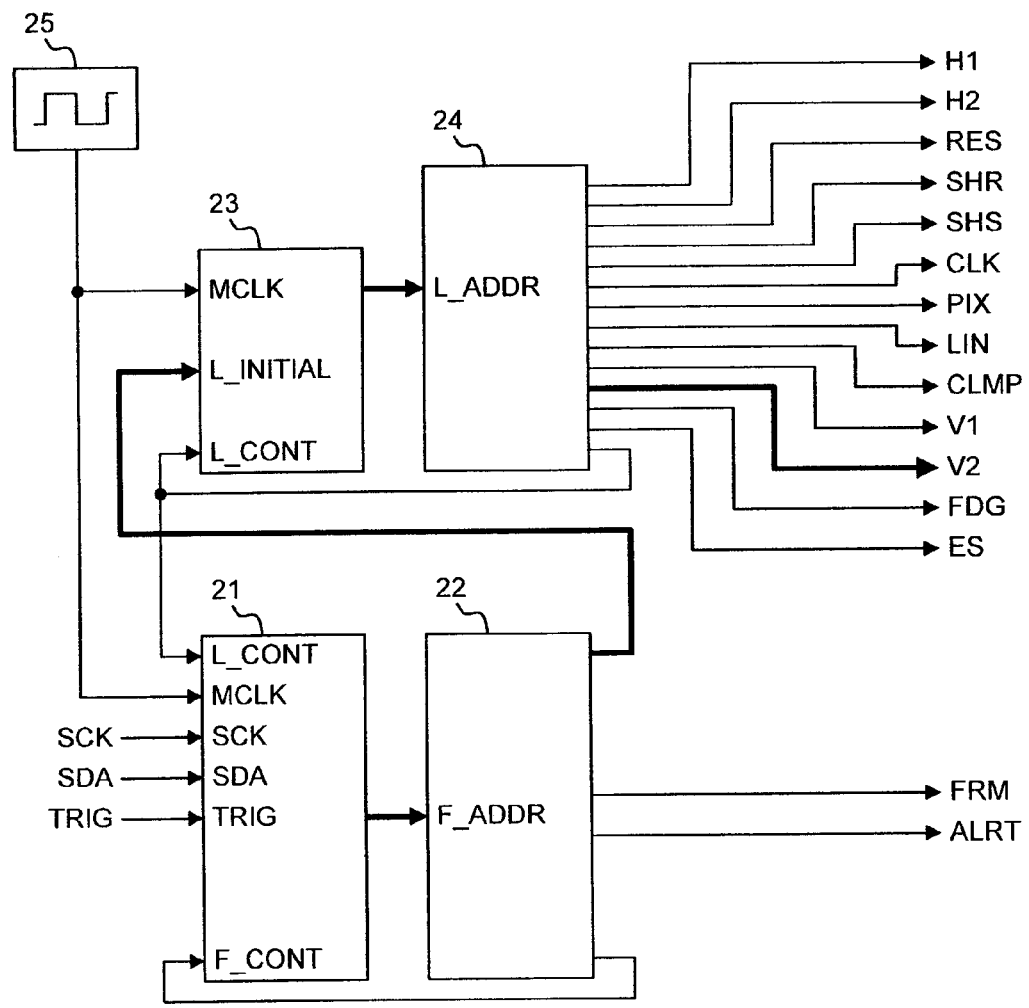
FIG. 6 is a block diagram of a timing generator that embodies the present invention and utilizes memory based line and frame tables.

FIG. 6 illustrates one embodiment of the present invention. The line table memory 24 is composed of a plurality of memory locations or line table entries, with each entry indicating the states of many of the timing generator outputs. One bit in each line table entry controls one output from the timing generator 9. Several sequential entries are required to provide the timing for each pixel as shown in FIG. 2, and this sequence of entries is repeated for every pixel in a line of pixels. In addition, there are timing sequences at the beginning and end of each line for operating the vertical clocks V1 and V2 and the electronic shutter timing signal ES. One bit of each entry, L_CONT, indicates that the sequence of entries continues; when L_CONT is low, then the sequence of entries providing the timing for a line is complete. The line table address generator 23 steps sequentially through the entries comprising a line, providing a new address to the line table memory via L_ADDR in response to the master clock 25, until an entry with L_CONT low is encountered in the line table memory. When L_CONT is low, the line table address generator stops incrementing the line table address. A starting address L_INITIAL for operation of the line table is provided by the frame table memory 22.

The frame table memory 22 in FIG. 6 is composed a plurality of memory locations or frame table entries, with each entry providing a starting address L_INITIAL for a line table, a bit to control the FRM output of the timing generator 9, and a bit to control the ALRT output. Each entry in the frame table memory references the beginning of a sequence of entries in the line table memory. A sequence of entries in the frame table memory can reference several different sequences of line table memory entries, thereby creating the timing for an entire readout frame: one line table memory sequence which provides the transfer timing as shown in FIG. 5A can be referenced at the beginning of reading out the frame, another sequence which provides the normal readout timing can be referenced by multiple entries in the frame table to read out multiple lines of pixels, and yet another sequence which provides the electronic shutter timing can be referenced by one entry in the midst of the normal read out entries. One bit of each entry, F_CONT, indicates that the sequence of entries continues; when F_CONT is low, then the sequence of entries providing the timing for a frame is complete. The frame table address generator 21 steps sequentially through the entries comprising a frame, providing a new address to the frame table memory via F_ADDR in response to the master clock 25, the L_CONT signal from the line table memory, and F_CONT from the frame table memory: when L_CONT is low and F_CONT is high, then the address on F_ADDR is incremented at the next clock, otherwise the address is held constant. When F_CONT is low, the frame table address generator stops incrementing the line table address.

Although image sensors and applications may vary widely, there are elements of commonality in image sensor timing that the present invention as described in the present embodiment exploits to reduce the size of the memory required to control an area image sensor. In particular, one finds that the pixels in given line have mostly the same timing requirements, with a few differences at the beginning and end of the line. Furthermore, one finds that the timing for a particular line or set of lines may be repeated many times during the readout of the frame. Hence, it is natural to divide the descriptions of timing into one set of tables that describe various different types of line timings, and another set of tables that refers to the individual elements of the first set of tables in order to describe how a frame is made up of sequences of a limited number of line types. This natural division is apparent in the present embodiment.

Although the present embodiment exploits the natural division into frame tables and line tables to reduce the amount of memory required to describe the timing required to operate an image sensor, further reductions in memory size can be realized by embedding counts and looping constructs into the line and frame tables. For example, a count can be provided in the line table that indicates for how many clock periods to output a given arrangement of timing outputs that remains the same for some length of time. Likewise, a count can be provided in the frame table that indicates how many times to execute the timing for a particular line type in order to read out and process a number of lines that have identical line timing. Furthermore, looping constructs in the frame table can provide a means for repetitively executing a sequence of lines, with each line in the sequence having unique timing, but with the entire sequence being executed a number of times. These counts and looping constructs add a modest amount of additional logic, but realize a significant reduction in memory size. Because of the natural repetitiveness of reading out an image sensor regardless of image sensor or application, employing frame tables and lines tables and further employing counts and looping constructs allows the timing to be described in a very compact memory and with a modest amount of supporting logic while maintaining a high degree of flexibility.

Figure 7:
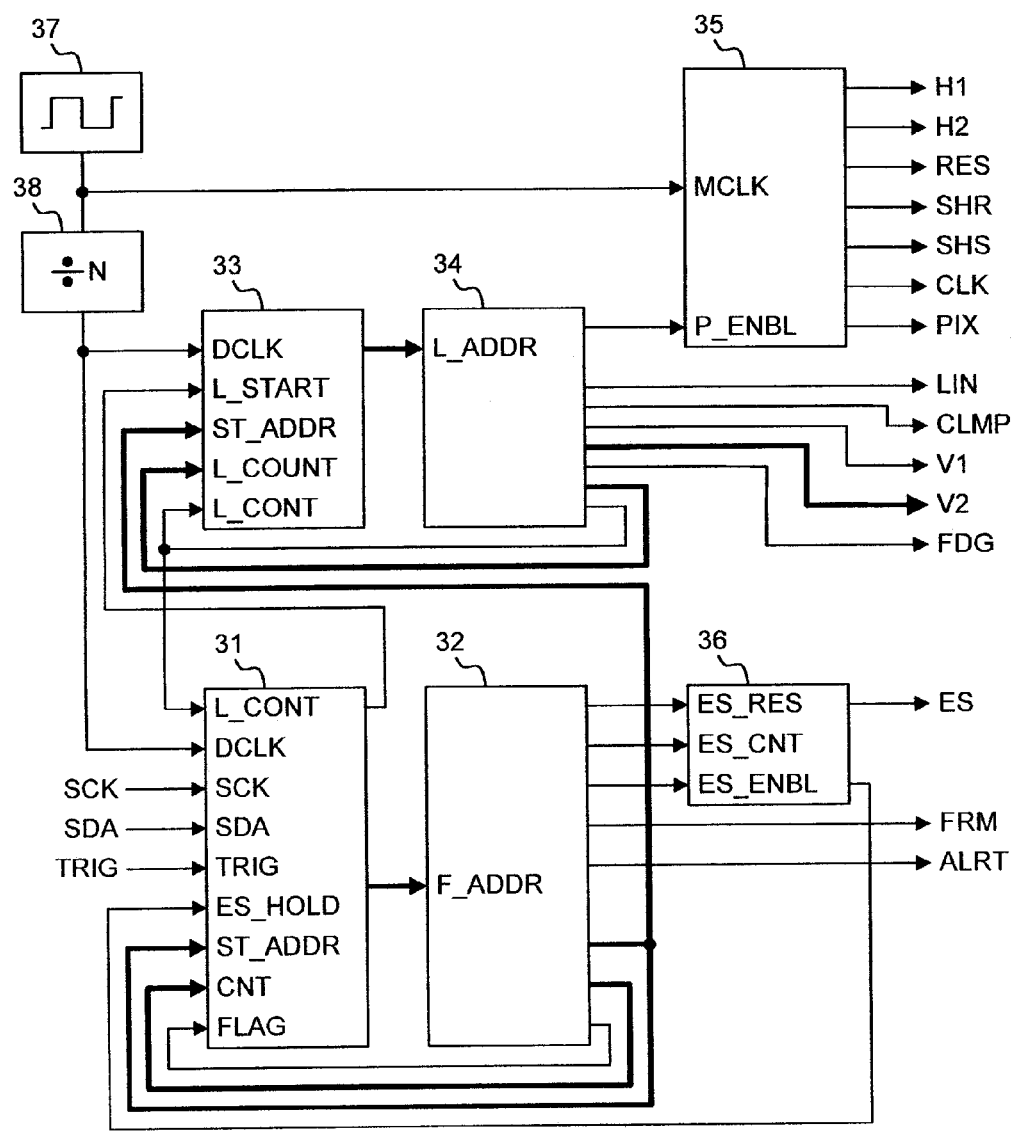
FIG. 7 is a block diagram of a timing generator that embodies the present invention as shown in FIG. 6 and that includes timing elements separate from, but interacting with, the line and frame tables.

An alternative embodiment of the present invention that includes the enhancements described above is shown in FIG. 7. In FIG. 7, each entry in the line table memory 34 includes an L_COUNT field. This field indicates for how many clock periods the current line table entry should be output. The line table address generator 33 will count this many clock periods before incrementing the address provided to the line table memory via L_ADDR. Each entry in the frame table memory 32 includes ST_ADDR, CNT, and FLAG fields which are used to provide a similar counting facility for frame tables, but which also provide a facility for looping repetitively through a sequence of frame table entries or for jumping from one frame table to another. The ST_ADDR field is also provided to the line table address generator 33 to provide the starting address for a sequence of line table entries. The control line L_START provided by the frame table address generator 31 indicates when the line table address generator should interpret the ST_ADDR field as a line table start address; the frame table address generator determines the function of the ST_ADDR field by analyzing the states of the FLAG and CNT fields as described later.

Note that the counter in the line table address generator 33 that utilizes L_COUNT may be a Gray code counter, well known for reducing synchronous electrical noise. It may be desirable to use a low noise counter for this purpose because the counting takes place at a pixel rate, and noise from the counter may subtly affect the imaging system on a pixel by pixel basis, causing a discernible fixed pattern to emerge in the image signal. The counter in the frame table address generator 31 that utilizes CNT may be a conventional binary counter, because the concern about noise is not so great for signals that occur once per line or once per frame. Because of this natural split into pixels within a line (the line table) and lines within a frame (the frame table), the appropriate counter type can be applied to each situation.

In addition to the enhancements outlined above, the embodiment shown in FIG. 7 includes additional improvements. The timing generator 35 for pixel level signals provides the timing within a pixel for a number of signals. This pixel level timing is shown in FIG. 2. This timing generally does not change on a pixel-to-pixel basis, or from line to line within a frame. By providing a separate timing generator for the fundamentally invariant pixel timing, the size of the line table memory can be reduced significantly by eliminating multiple line table entries for each pixel. The pixel timing generator 35 is controlled by a single bit of each frame table entry, P_ENBL. Since the timing events within a pixel are controlled by a separate timing generator, the clock provided to the line table address generator 33 and the frame table address generator 31 can be divided down by a clock divider circuit 38 from the master clock circuit 37. The full speed master clock is provided to the pixel timing generator to provide the fine timing required to properly place timing events within a pixel. Note that the pixel timing generator 35 could be implemented as a memory based timing generator similar to the line and frame tables. Note additionally that the pixel timing generator could employ delay lines or some other mechanism to avoid requiring a high speed clock.

In FIG. 6, moving the position of the electronic shutter timing control ES in order to shorten or lengthen the exposure time requires reordering the entries in the frame table memory in order to move the reference to the line table sequence that contains the ES timing. In FIG. 7, the electronic shutter (ES) timing generator 36 avoids the need to reorder the frame table entries by controlling the ES signal separately from the frame table and line table timing generator. Each frame table entry includes an ES_RES bit to reset the internal line count in the ES timing generator, an ES_ENBL bit to allow the ES timing generator to generate the ES signal if the line count in the ES timing generator matches a preset value in the ES timing generator, and an ES_CNT bit to cause the ES timing generator to increment its internal line count value. In addition to the ES output, the ES timing generator has an ES_HOLD output that causes the frame table address generator 31 to pause while the ES timing generator executes the electronic shutter signal sequence. With the addition of the ES timing generator, the position of the electronic shutter signal can be moved simply by changing the preset value to which the line count is compared.

The pixel timing generator and the ES timing generator demonstrate that separate timing generators can be employed in conjunction with the frame and line table based timing generator, and that controls and interlocks can allow the separate timing generators to interact with the frame and line table based timing generator. A separate timing generator can be controlled by bits within the line table, as in the pixel timing generator, or it can be controlled by bits within the frame table, as in the ES timing generator.

Figure 8:
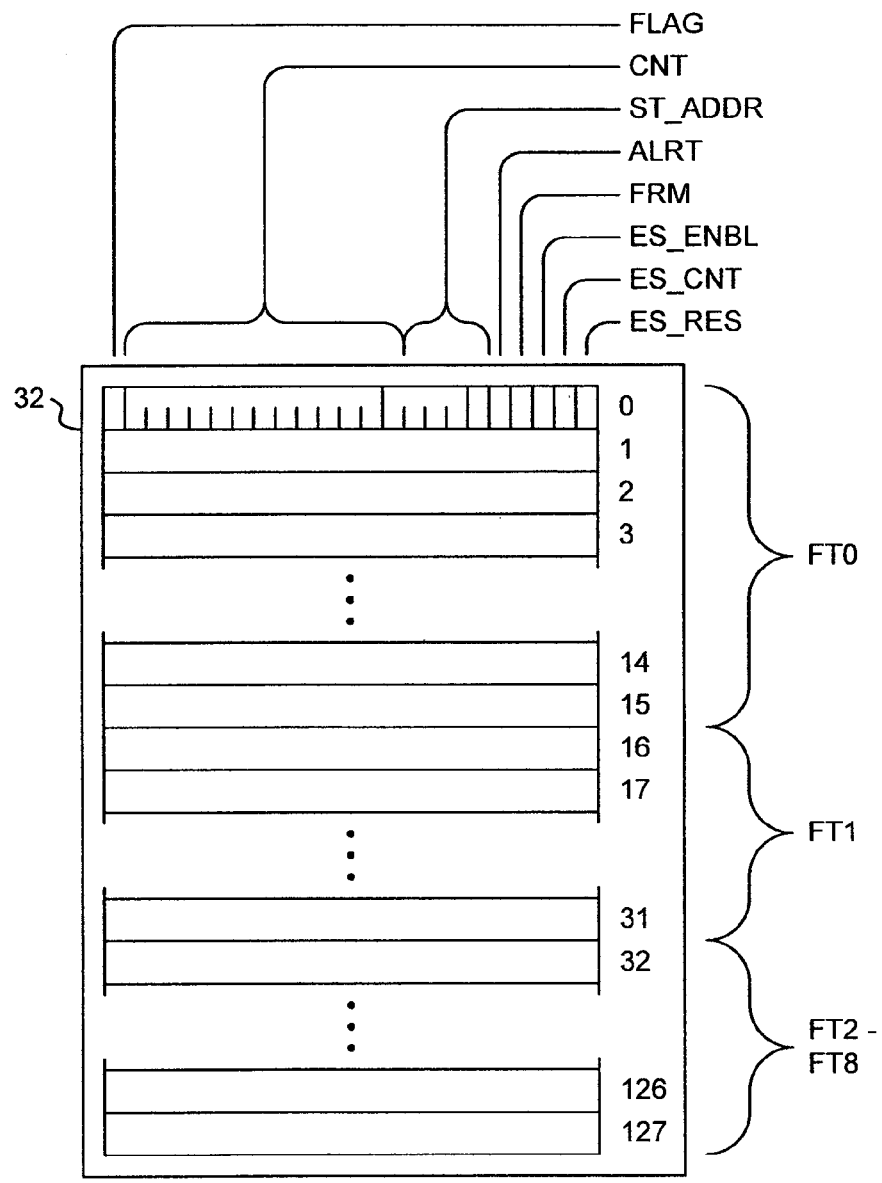
FIG. 8 is a memory map of the frame tables in the timing generator of FIG. 7, including the bit layout of the individual entries in the frame tables.

The memory layout for the frame table memory 32 of the present embodiment is shown in FIG. 8. Each frame table begins on an address boundary that is a multiple of 16 (i.e., addresses 0, 16, 32, 48, etc.); the frame tables are indicated by the labels FT0, FT1 . . . This address alignment reduces the number of bits required to reference a given frame table. There are eight frame tables in total, so three bits are required to refer to a given frame table. Each entry in the frame table memory is 23 bits long, and there are 128 total entries in the 8 frame tables, so the size of the frame table memory 32 is 2944 bits. Note that if the frame table address generator is allowed to increment past the frame table boundary, the 16 entries from each of two or more adjacent frame tables can be combined to create larger frame tables. Note also that the frame table boundaries noted in FIG. 8 are a detail of implementation and many arrangements of bits and boundaries can be implemented within the scope of this invention.

Figure 9:
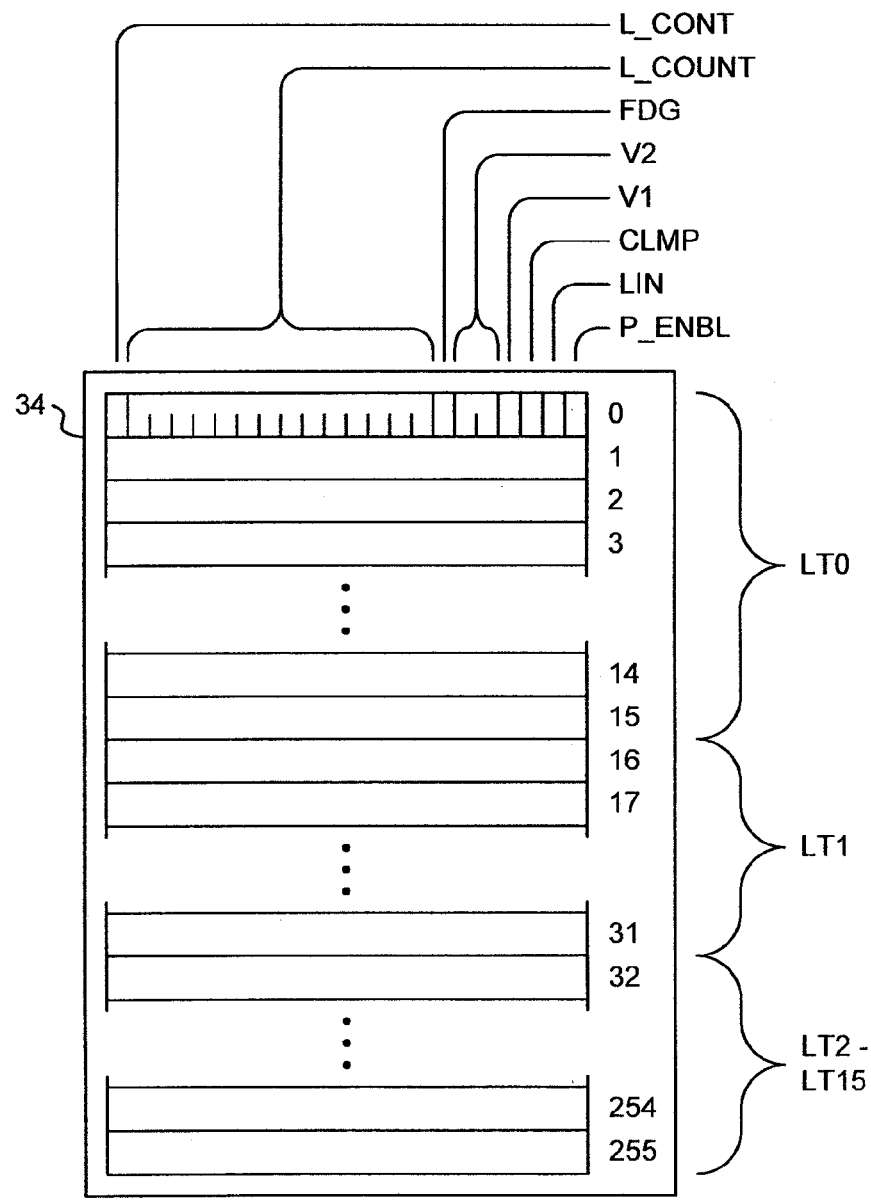
FIG. 9 is a memory map of the line tables in the timing generator of FIG. 7, including the bit layout of the individual entries in the line tables.

The memory layout for the line table memory 34 of the present embodiment is shown in FIG. 9. Each line table begins on an address boundary that is a multiple of 16 (i.e., addresses 0, 16, 32, 48, etc.); the line tables are indicated by the labels LT0, LT1 . . . This address alignment reduces the number of bits required to reference a given line table. There are sixteen line tables in total, so four bits are required to refer to a given line table. With sixteen different line tables available, sixteen different types of lines can be described. Each entry in the line table memory is 22 bits long, and there are 256 total entries in the 16 line tables, so the size of the line table memory 34 is 5632 bits. Note that if the line table address generator is allowed to increment past the line table boundary, the 16 entries from each of two or more adjacent line tables can be combined to create larger line tables. Note also that the line table boundaries noted in FIG. 9 are a detail of implementation and many arrangements of bits and boundaries can be implemented within the scope of this invention.

In order to minimize the number of bits required for each table entry, some of the bit fields that comprise the frame and line table entries may take on different meanings depending on the meanings of other bit fields. For example, a bit field in an entry in a frame table that selects a line table if another bit field in the frame table entry is greater than zero may alternatively select a frame table instead of a line table if the other bit field is equal to zero. In FIG. 7, the FLAG, CNT, and ST_ADDR bit fields from frame table memory 32 have interpretations as shown in Table I.

TABLE I

| FLAG | CNT | ST_ADDR(3) | ST_ADDR(2:0) | Name |
|------|-----|------------|--------------|---------|
| 0 | 0 | 0 | FFF | JmpFT |
| 0 | 0 | 1 | FFF | JmpFTTR |
| 1 | 0 | T | TTT | ExLTTR |
| 0 | >0 | T | TTT | ExLT |
| 1 | >0 | E | EEE | Loop |

In Table I, the names in the Name column are mnemonics for different operations that the frame table address generator 31 will execute when a frame table entry with the given encoding is encountered. JmpFT jumps to the first entry of frame table FFF, as indicated by ST_ADDR(2:0). JmpFTTR jumps to the first entry of frame table FFF when an event is detected on the TRIG input to the address generator 31. ExLTTR repetitively executes the line table TTTT as indicated by ST_ADDR(3:0) until an event is detected on the TRIG input. ExLT executes the line table TTTT the number of times indicated by CNT. The signal L_START is asserted to the line table address generator 33 for the ExLTTR and ExLT operations. The first time Loop is encountered in the execution of a frame table, it loads a count variable with CNT and jumps to the frame table entry EEEE as indicated by ST_ADDR(3:0) in the same frame table. On subsequent encounters, Loop decrements the count variable; if the count variable is greater than zero after it is decremented then Loop jumps to the frame table entry EEEE in the same frame table as the Loop, otherwise execution continues with the next entry in the frame table.

As can be seen in the foregoing, the FLAG bit indicates how the CNT field should be used: either as a count for how many times to execute a line table, or as a count for how many times to loop through a sequence of frame table entries. In the latter case, the ST_ADDR field indicates the next entry of the frame table to be executed. It can be seen also that the ST_ADDR field and the FLAG/CNT fields are interdependent: the meaning of the ST_ADDR field changes depending on the values contained in the FLAG/CNT fields. Although the frame table entries could be constructed to have separate bit fields to refer to a frame table, a frame table entry, and a line table, there is not a situation that requires more than one of these references at a time, so changing the meaning of the ST_ADDR field depending on the FLAG/CNT fields instead of having separate fields minimizes the number of bits required for each frame table entry and also prevents conflicts or uncertainties by eliminating unused fields.

Note that JmpFTTR and ExLTTR both depend on the status of the TRIG input to the timing generator. These frame table encodings are used to synchronize timing generator operation to an external signal.

Tables II and III provide an example of how the line table memory 34 and the frame table memory 32 may be programmed to generate the timing shown in FIG. 3, FIG. 4, FIG. 5A, and FIG. 5B.

Table II provides an example for programming the line table memory to provide timing for five different types of lines. In Table II, each table entry is preceded by its address in the line table memory. In accordance with the line table memory layout shown in FIG. 9, the bit fields in the line tables are shown as decimal numbers separated by colons in the following order: L_CONT, L_COUNT, FDG, V2, V1, CLMP, LIN, and P_ENBL. Each complete line table is preceded by a descriptive name.

TABLE II

| Address | Line Table Entry | Function |
|---------|------------------|----------|
| | | Line Table 0 - Normal Read |
| 0 | 1:0200:0:1:0:0:0:0 | begin to transfer a line of image information to horizontal shifter |
| 1 | 1:0200:0:0:1:0:0:0 | complete transfer operation |
| 2 | 1:0008:0:0:1:0:0:1 | begin to read out pixels |
| 3 | 1:0012:0:0:1:1:0:1 | operate black clamp circuit |
| 4 | 1:0005:0:0:1:0:0:1 | Skip some pixels |
| 5 | 1:2475:0:0:1:0:1:1 | Read out and capture pixel information |
| 6 | 0:0001:0:0:1:0:0:0 | end of table - return to frame table |
| ... | | Line Table 1 - Transfer |
| 16 | 1:0200:0:1:0:0:0:0 | prepare to transfer image information from photosensitive areas to vertical shifters |
| 17 | 1:0500:0:2:0:0:0:0 | execute transfer operation |
| 18 | 1:0200:0:1:1:0:0:0 | complete transfer operation |
| 19 | 1:0200:0:0:1:0:0:0 | return to normal state |
| 20 | 1:2500:0:0:1:0:0:1 | prepare horizontal shifter for image readout |
| 21 | 0:0001:0:0:1:0:0:0 | end of table - return to frame table |
| ... | | Line Table 2 - Dump 2 Lines |
| 32 | 1:0030:1:0:1:0:0:0 | Turn on fast dump gate |
| 33 | 1:0200:1:1:0:0:0:0 | begin to transfer a line of image information to fast dump gate with fast dump gate enabled |
| 34 | 1:0200:1:0:1:0:0:0 | complete transfer operation |
| 35 | 1:0200:1:1:0:0:0:0 | begin to transfer another line of image information to fast dump gate with fast dump gate enabled |
| 36 | 1:0200:1:0:1:0:0:0 | complete transfer operation |
| 37 | 1:0030:0:0:1:0:0:0 | Turn off fast dump gate |
| 38 | 0:0001:0:0:1:0:0:0 | end of table - return to frame table |
| ... | | Line Table 3 - Transfer for Flush |
| 48 | 1:0200:0:1:0:0:0:0 | prepare to transfer image information from photosensitive areas to vertical shifters |
| 49 | 1:0500:0:2:0:0:0:0 | execute transfer operation |
| 50 | 1:0200:0:1:1:0:0:0 | complete transfer operation |
| 51 | 1:2000:1:0:1:0:0:0 | return to normal state - do not operate pixel timing generator |
| 52 | 0:0001:1:0:1:0:0:0 | end of table - return to frame table |
| ... | | Line Table 4 - Flush Line |
| 64 | 1:0200:1:1:0:0:0:0 | begin to transfer a line of image information to fast dump gate with fast dump gate enabled |
| 65 | 1:0200:1:0:1:0:0:0 | complete transfer operation |
| 66 | 0:0001:1:0:1:0:0:0 | end of table - return to frame table |
| ... | | |

Line Table 0 describes a normal readout line. The first two entries at addresses 0 and 1 operate the vertical clocks in order to move a line of pixels into the horizontal shifter in the image sensor 1: V2 is brought high and V1 is brought low for 200 clock periods, then V2 is returned low and V1 is returned high for 200 clock periods. The line table entries at addresses 2 through 5 enable the pixel timing generator 35 by the P_ENBL signal: the entry at address 2 skips 8 pixels, the entry at address 3 brings the CLMP signal high for the next 12 pixels so that the black clamp circuit 5 can collect data from the light shielded pixels, the entry at address 4 skips the next 5 pixels, and the entry at address 5 asserts the LIN signal so the framestore 7 will collect the data. In all the entries except for the last one in the line table, L_CONT is high to indicate that execution of the line table should continue with the next entry. In the last line table entry at address 6, L_CONT is brought low to indicate that the execution of the line table is complete and that control should return to the frame table.

Line Table 1 describes a transfer of image information from the light sensitive areas to the vertical shifters in the image sensor 1 in preparation for reading out the image sensor. The entry at address 16 brings V2 high for 200 clock periods; the entry at address 17 sends V2 to a still higher level and brings V1 low for 500 clock periods to cause the transfer to take place, the entry at address 18 returns V2 and V1 to the same levels as the entry at address 16 for 200 clock periods, then the entry at address 19 returns V2 to a low level for 200 clock periods. The entry at address 20 enables the pixel timing generator for 2500 clock periods in order to prepare the horizontal shifter for readout; note that the LIN signal is not asserted so that the framestore 7 does not collect this information. The final entry at address 21 brings L_CONT low to indicate that the execution of the line table is complete and that control should return to the frame table.

Line Table 2 describes dumping two lines of image information by using the FDG—Fast Dump Gate—signal into the image sensor 1. The first entry at addresses 32 brings FDG high for 30 clock periods to allow the fast dump gate mechanism in the image sensor to become operational. The entries at addresses 33 and 34 operate the vertical clocks V1 and V2 in order to move a line of pixels into the fast dump gate. The entries at addresses 35 and 36 repeat this in order to move a second line of pixels into the fast dump gate. The entry at address 37 brings FDG back low for 30 clock periods to allow the fast dump gate mechanism to turn off. The final entry at address 21 brings L_CONT low to indicate that the execution of the line table is complete and that control should return to the frame table.

Line Table 3 describes a transfer of image information from the light sensitive areas to the vertical shifters in the image sensor 1 in preparation for flushing the image information out the image sensor without collecting it. This line table is intended to be used in conjunction with Line Table 4. The entries at addresses 48, 49, and 50 operate the vertical clocks V1 and V2 in the same way as the first three entries of Line Table 0 in order to move the image information into the vertical shifters. The entry at address 51 adds a delay of 2000 clock periods to allow the transfer to finish and also brings the FDG signal high. The final entry at address 52 brings L_CONT low to indicate that the execution of the line table is complete and that control should return to the frame table.

Line Table 4 describes dumping a single line of image information by using the FDG signal into the image sensor 1. Since this line table is intended to be used repetitively to flush an entire frame of image information, the FDG signal is left high throughout the table. The entries at addresses 64 and 65 operate the vertical clocks V1 and V2 in order to move a line of pixels into the fast dump gate. The final entry at address 66 brings L_CONT low to indicate that the execution of the line table is complete and that control should return to the frame table.

Table III provides an example for programming the frame table memory 32 to provide timing for three different types of frames. In Table III, each table entry is preceded by its address in the frame table memory. In accordance with the frame table memory layout shown in FIG. 8, the bit fields in the frame tables are shown as decimal numbers separated by colons in the following order: FLAG, CNT, ST_ADDR bit 3, ST_ADDR bits 2 to 0, ALRT, FRM, ES_ENBL, ES_CNT, and ES_RES. Each complete frame table is preceded by a descriptive name.

TABLE III

| Address | Frame Table Entry | Function |
|---|---|---|
|  |  | Frame Table 0 - Normal Readout |
| 0 | 0:0001:0:1:0:0:0:0:1 | execute line table 1 to transfer image signals from photosites to vertical shifters |
| 1 | 0:1200:0:0:0:1:1:1:0 | execute line table 0 1200 times to read out 1200 lines |
| 2 | 0:0000:0:0:0:0:0:0:0 | jump to first entry of frame table 0 to continuously execute this frame timing |
|  |  | Frame Table 1 - Dump 2 of 3 Lines |
| 16 | 0:0001:0:1:0:0:0:0:1 | execute line table 1 to transfer image signals from photosites to vertical shifters |
| 17 | 0:0002:0:2:0:1:1:0:0 | execute line table 2 twice to dump two lines |
| 18 | 0:0001:0:0:0:1:1:1:0 | execute line table 0 once to read out a line |
| 19 | 1:0399:0:1:0:1:1:0:0 | loop from here to the second entry of this frame table 399 more times |
| 20 | 0:0000:0:1:0:0:0:0:0 | jump to first entry of frame table 1 to continuously execute this frame timing |
|  |  | Frame Table 2 - Flush Entire Frame |
| 32 | 0:0001:0:3:0:0:0:0:1 | execute line table 3 to transfer image signals from photosites to vertical shifters in preparation for flush |
| 33 | 0:1200:0:4:0:0:0:0:0 | execute line table 4 1200 times to dump all lines |
| 34 | 0:0000:0:0:0:0:0:0:0 | jump to first entry of frame table 0 to continue with normal timing |

Frame Table 0 describes a mode of operation in which the image sensor 1 continuously collects image information and the image information is read out and stored in the framestore 7. The timing for this mode of operation is shown in FIG. 5A. The electronic shutter capability is operated by the electronic shutter signal timing generator 36. The first entry at address 0 executes line table 1 in order to transfer the accumulated image information from the photosensitive areas of the image sensor to the vertical shifters; the electronic shutter timing generator is reset at the same time. The entry at address 2 executes line table 0 1200 times in order to readout 1200 lines of image information; the FRM signal is asserted so the framestore 7 will collect the image information. Also, the electronic shutter timing generator is enabled so it will count each time the line table is executed, and, if the count reaches the line at which the electronic shutter signal sequence should take place, the ES signal will be sent to the image sensor and the operation of the frame table address generator 31 will be delayed by the ES_HOLD signal. The final entry jumps back to the first entry of frame table 0.

Frame Table 1 describes a mode of operation similar to Frame Table 0, but two out of every three lines of image information are dumped by using the fast dump gate facility in the image sensor 1. The timing for this mode of operation is shown in FIG. 4. The first entry at address 16 executes line table 1 in order to transfer the accumulated image information from the photosensitive areas of the image sensor to the vertical shifters; the electronic shutter timing generator is reset at the same time. The entry at address 17 executes line table 2 twice in order to dump 2 lines of image information; note that the ES_CNT signal to the electronic shutter timing generator is low to prevent counting these dumped lines. The entry at address 18 executes line table 0 to read out a single line of image information; ES_CNT is high to enable counting this line, and ES_ENBL is high to allow the ES signal to be sent to the image sensor at the beginning of the appropriate line. The entry at address 19 incorporates the Loop instruction. The first time this entry is encountered, it sets a counter to 399 and jumps to entry 1 of this frame table (at address 17). On subsequent encounters, this entry decrements the counter. If the counter is greater than zero after it is decremented, frame table execution continues with entry 1, otherwise frame table execution drops through to the next entry of the frame table at address 20. In this fashion, the frame table entries at addresses 17 and 18 will be executed 400 times, with 400 out of 1200 lines of image information collected. The final entry at address 20 jumps back to the first entry of frame table 1.

Frame Table 2 describes a mode of operation in which the image information in the image sensor 1 is flushed out of the image sensor and no information is collected in the framestore 7. The timing for this mode of operation is shown in FIG. 5B in the TRANSFER and FLUSH periods. The first entry at address 32 executes line table 3 in order to transfer the accumulated image information from the photosensitive areas of the image sensor to the vertical shifters and to enable the FDG signal to the image sensor 1. The entry at address 33 executes line table 0 1200 times in order to dump 1200 lines of image information. The final entry at address 34 jumps back to the first entry of frame table 0 so that normal collection of image information may commence.

Note that the memories for the line table memories and the pixel table memories could be of several varieties. The memories could be volatile memories such as SRAM or DRAM that lose their contents when power is turned off and which must be programmed with the line and frame table entries when power is restored. The memories could be non-volatile memories such as EEPROM or flash EPROM that retain their contents even when power is turned off. For a fixed application, the memories could be read only memories that are programmed during manufacture and the contents of which cannot be changed.

Note that the embodiment described in the foregoing has separate memories for the frame table and the line table. An alternative embodiment could combine these two memories into a single physical device. In this case the address generator for the single combined memory would have the additional capability of storing the frame table address while a line table is being executed, and recalling the frame table address to continue execution of the frame table when line table execution is completed.

The invention has been described with reference to a preferred embodiment. However, it will be appreciated that variations and modifications can be effected by a person of ordinary skill in the art without departing from the scope of the invention. In particular, it should be noted that although the embodiments described herein make reference to a commonly known interline CCD image sensor, the present invention could be applied to any type of image sensor, including a CMOS image sensor or a linear image sensor.

PARTS LIST

1 Image Sensor
2 Sample and Hold Circuit for Reference Signal
3 Sample and Hold Circuit for Image Signal
4 Summing Circuit for Reference, Image, and Black Clamp Signals
5 Black Clamp Sampling Circuit
6 Analog to Digital Converter
7 Digital Framestore Memory
8 Signal Buffer (one of several similar)
9 Timing Generator
10 System Controller and Image Data Processor
11 Horizontal Shift Register
12 Vertical Shift Registers/Rows and Columns of Light Sensitive Pixels
21 Address Generator for Frame Table Memory
22 Frame Table Memory
23 Address Generator for Line Table Memory
24 Line Table Memory
25 Master Clock Circuit
31 Enhanced Address Generator for Frame Table Memory
32 Frame Table Memory
33 Enhanced Address Generator for Line Table Memory
34 Line Table Memory
35 Timing Generator for Pixel Level Signals
36 Timing Generator for Electronic Shutter Signal
37 Master Clock Circuit
38 Clock Divider Circuit

What is claimed is:

1. A timing generator for an electronic imaging system comprising:
   (a) a first memory table that contains one or more descriptions of timing events that occur within a line of pixels;
   (b) a second memory table that contains one or more descriptions of timing events that occur within an n-dimensional array of pixels, wherein both memory tables operate cooperatively to control the electronic imaging system in a plurality of different operating modes; and
   one or more separate timing generators operable to receive one or more signals from at least one of the first memory table and the second memory table for controlling other timing events that are independent of timing controlled by the first and second memory tables.

2. A timing generator as in claim 1, wherein an entry in the second memory table refers to one or more entries in the first table.

3. The timing generator as in claim 1, wherein an entry in the first memory table or the second memory table includes (i) a count field; (ii) a control bit that indicates how the count field is used.

4. A timing generator as in claim 3, wherein the control bit indicates that the count field indicates how many times to operate the entry in a repetitive fashion.

5. A timing generator as in claim 3, wherein the control bit indicates that the count field indicates how many times to operate a sequence of entries in a repetitive fashion.

6. The timing generator as in claim 5, wherein an entry in the sequence indicates the next entry to be executed.

7. A timing generator as in claim 1 wherein an entry in the first memory table or the second memory table includes a plurality of fields and control bits, wherein the meanings of the fields and the control bits are interdependent.

8. A timing generator as in claim 7 wherein the fields and control bits are combined to prevent logical conflicts in usage and to minimize the number of bits required.

9. A timing generator as in claim 1 wherein the one or more separate timing generators for controlling other timing events comprise at least one of a timing generator for pixel level signals and an electronic shutter timing generator.

10. A timing generator as in claim 1 wherein the first and second memory table controlled timing generator and the separate timing generators are interlocked by control signals between the separate timing generators and the memory table controlled timing generator.

11. A timing generator as in claim 10, wherein operation of the separate timing generator is controlled by bits within the first memory table.

12. A timing generator as in claim 10, wherein operation of the separate timing generator is controlled by bits within the second memory table.

13. A timing generator as in claim 10, wherein the separate timing generator further comprises a third memory which is used to control timing events within a pixel.

14. A timing generator as in claim 1, wherein either or both of the first and second memory tables are volatile read/write memories.

15. A timing generator as in claim 1, wherein either or both of the first and second memory tables are non-volatile read/write memories.

16. A timing generator as in claim 1 in which the memories are read-only-memories.

17. A timing generator for an electronic imaging system comprising:
   (a) a first memory table that contains one or more descriptions of timing events that occur within a line of pixels;
   (b) either the first memory table or a second memory table contains one or more descriptions of timing events that occur within an n-dimensional array of pixels, wherein both memory tables operate cooperatively to control the electronic imaging system in a plurality of different operating, and
   one or more separate timing generators operable to receive one or more signals from at least one of the first memory table and the second memory table for controlling other timing events that are independent of timing controlled by the first and second memory tables.

18. The timing generator as in claim 17, wherein at least one of the descriptions of timing events for either a given line of pixels or the n-dimensional array of pixels has two or more interpretations and which one of the two or more interpretations utilized is determined by another description of timing events.

* * * * *

UNITED STATES PATENT AND TRADEMARK OFFICE
CERTIFICATE OF CORRECTION

| | | |
|---|---|---|
| PATENT NO. | : 7,304,676 B2 | Page 1 of 1 |
| APPLICATION NO. | : 10/635332 | |
| DATED | : December 4, 2007 | |
| INVENTOR(S) | : John T. Compton et al. | |

It is certified that error appears in the above-identified patent and that said Letters Patent is hereby corrected as shown below:

Column 16, line 4            "operating, and" should read --operating modes; and--

Signed and Sealed this

First Day of July, 2008

JON W. DUDAS
*Director of the United States Patent and Trademark Office*